United States Patent Office 2,918,503
Patented Dec. 22, 1959

2,918,503

PRODUCTION OF PARA-TERPHENYL

Leon M. Adams, La Marque, Tex., assignor to The American Oil Company, Texas City, Tex., a corporation of Texas No Drawing. Application June 23, 1958
Serial No. 744,012

8 Claims. (Cl. 260—670)

This invention relates to a process for producing para-terphenyl compounds, and in particular it concerns the preparation of para-terphenyl compounds from α-methylstyrene compounds.

I have found that when an α-methylstyrene is subjected to a temperature between about 150° and 700° C. in the presence of a small amount of an iodine compound, the reaction products which are produced will contain a para-terphenyl compound. At least a small portion of the α-methylstyrene compound which is employed should be maintained in the liquid state in the reaction zone. The reaction is preferably carried out under substantially anhydrous conditions. Iodine compounds such as iodine itself, organic iodides such as aliphatic iodides, cycloaliphatic iodides, etc. are used in small amounts in the reaction zone. Suitable amounts of the iodine compound are from 0.01 to 5% by weight based upon the α-methylstyrene compound. In addition to the para-terphenyl compound, the reaction products also contain hydrogenated α-methylstyrene compound and other higher boiling materials. For example, 1-methyl-1,3-diphenyl cyclopentadiene is also produced when α-methylstyrene is subjected to the reaction.

The reactions involved in producing the para-terphenyl compound from the cumene compound are theorized as proceeding in the following manner:

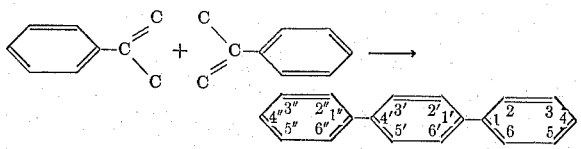

The above unbalanced equation indicates the reactants and the product. It is postulated that two α-methylstyrene molecules condense through the olefin linkages to form 1,4-diphenyl cyclohexane as an intermediate. One mole of this compound is then believed to react with three moles of α-methylstyrene by hydrogen transfer to yield three moles of cumene and one mole of para-terphenyl. While the specification and claims will hereinafter refer to reacting α-methylstyrene to produce para-terphenyl, it is to be understood that α-methylstyrene also includes substitution products thereof in which one or more of the hydrogen atoms attached to the benzene ring is replaced by a substituent grouping. For example, α-methylstyrene is to be understood as including compounds such as 1-methyl-3-isopropenyl benzene. The product para-terphenyl which is produced will contain methyl substituents in the 4 and 4″ positions of the para-terphenyl molecule. It is also to be understood that whenever the term para-terphenyl is used hereinafter in the specification and claims that it includes the corresponding substituted para-terphenyl compound produced from the starting substituted α-methylstyrene compound that is used. It is quite apparent that the presence of substituents in place of the hydrogen attached to any carbon atom of the benzene ring of the α-methylstyrene does not have any role in the reaction and does not sterically hinder it. Thus the hydrogen atoms in the benzene ring may be substituted by alkyl groups of from 1 to 4 carbon atoms, and the corresponding para-terphenyl which is produced will contain the substituents in the first and third benzene rings. It is further to be understood that compounds which afford α-methylstyrene and substituents thereof under the conditions of the reaction are also included within the definition of α-methylstyrene. Examples are 2,4-diphenyl-4-methylpentene-1 and 2,4-diphenyl-4-methylpentene-2. These latter two examples are the unsaturated dimers of α-methylstyrene which crack to yield α-methylstyrene under the reaction conditions.

Various iodine compounds can be used in the reaction. Iodine itself is quite effective. Organic iodine compounds may satisfactorily be employed. Hydrocarbon iodides such as the aliphatic iodides, cycloaliphatic iodides, aromatic iodides may be employed. Aliphatic iodides such as isopropyl iodide are quite effective in causing the reaction to proceed. Examples of other iodides which may be used are tetraiodo ethane, iodomethyl cyclohexane, benzyl iodide, cyclohexyl iodide, isoamyl iodide, etc. In carrying out the reaction, it is prefered to employ substantially anhydrous conditions, particularly when hydrogen iodide is employed. The iodine compound is generally used in small amounts, such as from 0.01 to 5% by weight based upon the α-methylstyrene, but even lesser and larger amounts may be employed. From 0.1 to 1% by weight of the iodine compound is generally satisfactory. Surprisingly, bromine compounds are ineffective in this reaction for producing para-terphenyl.

The reaction should be carried out under conditions under which at least a portion of the α-methylstyrene is in the liquid phase in the reaction zone. Very little if any para-terphenyl is produced when the α-methylstyrene is employed totally in the vapor phase in the reaction zone. Temperature and pressure may suitably be adjusted to maintain the α-methylstyrene in the liquid phase in the reaction zone. In order to produce the para-terphenyl, it is necessary that reaction temperatures above about 150° C. be used. At lower temperatures α-methylstyrene dimers and trimers are produced but no para-terphenyl is produced. The reaction may be carried out at temperatures up to about 700° C., and preferred temperatures are in the range of about 400° to 600° C. The pressure employed is that sufficient to maintain the α-methylstyrene at least partly in the liquid phase at the operating temperature. Thus pressures in the neighborhood of 50 to 2000 p.s.i.g. may be employed. A wide range of contact times may be used, depending upon the yield of para-terphenyl desired and the operating temperature. Thus space velocities ranging between 0.5 and 50 volumes of charge per hour per volume of reactor space may be used, space velocities of from 5 to 25 being quite suitable.

When using α-methylstyrene as the reactant, the reaction products will contain isopropylbenzene, 1,3,3-trimethyl-1-phenyl-hydrindene, para-terphenyl, 1-methyl-1,3-diphenyl cyclo-pentadiene, and some hard friable black resin. A para-terphenyl fraction can be distilled from the reaction products. The para-terphenyl can then be recovered from this fraction by refractionation or by precipitation using acetone or cyclohexane, or by other suitable techniques. The 1-methyl-1,3-diphenyl cyclopentadiene (which has a refractive index of 1.6557 at 25° C. and boils at 133° C. at 1.0 mm. Hg abs.) can be recovered from the reaction products by fractionation.

Experiments were carried out which are illustrative of the present invention. In the first set of experiments, the results of which are reported in Table I, α-methylstyrene was introduced into a bomb reactor, iodine was added thereto in the amount specified, and the bomb heated to the temperature indicated. The indicated reaction time was employed. At the end of the run, the reaction products were recovered and the amount of para-terphenyl (as mol percent of theoretical) was determined. The results obtained are shown in Table I.

*Table I*

| Temp., °C. | Time at Temp. | Percent Iodine | p-Terphenyl [1], Mol Percent |
|---|---|---|---|
| 250 | 4 | 0.3 | 6.2 |
| 300 | 1 | 0.3 | 6.2 |
| 300 | 1 | [2] 1.0 | 10 |
| 300 | 1 | [2] 0.1 | 10 |

[1] Terphenyl recovered by crystallization from acetone and determined as mol percent of theoretical.
[2] Added as isopropyl iodide.

The average product distribution, in terms of weight percent of the total reaction products, was determined for the products of the third run reported in Table I supra. The product distribution is shown in Table II.

TABLE II

*Typical product distribution*

|  | Percent |
|---|---|
| Cumene | 58–60 |
| 1,3,3-trimethyl-1-phenylhydrindene | 9–11 |
| p-Terphenyl | 4–4.5 |
| 1-methyl-1,3-diphenylcyclopentadiene | 2.5–3 |
| Resin | 21–22 |

The cumene in the reaction products can be dehydrogenated to α-methylstyrene and returned to the reaction zone. The weight percent paraterphenyl in the product is substantially less than the conversion to para-terphenyl in mol percent of theoretical as shown in Table I because the maximum theoretical yields are 40% by weight.

Another series of runs was carried out in a continuous flow reactor. The temperature and flow rates were varied in the different runs. The pressure was sufficient to maintain α-methylstyrene in the liquid phase, a pressure of about 600 p.s.i.g. being used most of the time. Isopropyl iodide equivalent to 1% iodine (based on α-methylstyrene) was added to the α-methylstyrene charged to the continuous flow unit. The amount of para-terphenyl in the product was determined. The results obtained in these runs are shown in Table III.

It is evident from Table III that wide variations in temperature and space velocity can be used in carrying out the reaction. The yield of paraterphenyl appears to increase as the reaction temperature is increased.

TABLE III

| Temp., °C. | Space Velocity [1] | p-Terphenyl, Mol. Percent [2] |
|---|---|---|
| 300 | 4 | 5.0 |
| 300 | 10 | 12.0 |
| 300 | 20 | 6.7 |
| 400 | 20 | 13.5 |
| 600 | 4.6 | 21.5 |

[1] In vol. charge/hr./vol. of reactor space.
[2] Mol percent of theoretical.

While the invention has been illustrated by reference to certain examples thereof, it should be understood that it is not limited thereto but includes within its scope variations thereof as would be apparent to one skilled in the art from the description of the invention.

What is claimed is:
1. A process for preparing a para-terphenyl which comprises subjecting an α-methylstyrene to reaction in the liquid phase at a temperature between about 150° and 700° C. in the presence of a catalytically effective amount of an iodine compound and recovering a para-terphenyl from the reaction products.
2. The process of claim 1 in which the reaction is carried out under substantially anhydrous conditions.
3. The process of claim 1 in which said iodine compound is an aliphatic iodide.
4. The process of claim 1 in which said iodine compound is iodine.
5. The process of claim 1 in which said iodine compound is employed in amounts between about 0.01 and 5% by weight based upon said α-methylstyrene.
6. The process of claim 1 in which α-methylstyrene is converted to para-terphenyl which is recovered from the reaction products.
7. A process which comprises subjecting α-methylstyrene in the liquid phase to reaction at a temperature between about 400° and 600° C. in the presence of about 1% by weight of isopropyl iodide and recovering para-terphenyl from the reaction products.
8. The process of claim 7 in which 1-methyl-1,3-diphenyl cyclopentadiene is also recovered from the reaction products.

References Cited in the file of this patent

Kuhn et al.: Berichte, vol. 60B (1927), pp. 432–434.
Rodd: "Chemistry of Carbon Compounds," 1956, Elsevier Publishing Co. (N.Y.) (pp. 1050–1051 relied on).
Mikhailov et al.: Chemical Abstracts, volume 50, 1956, page 4080g.